United States Patent [19]
Collins, Jr. et al.

[11] Patent Number: 5,588,621
[45] Date of Patent: Dec. 31, 1996

[54] UNIVERSAL MOUNTING APPARATUS AND METHOD FOR BAR CODE SCANNERS

[75] Inventors: Donald A. Collins, Jr., Duluth; Rex A. Aleshire, Buford, both of Ga.

[73] Assignee: AT&T Global Information Solutions Company, Dayton, Ohio

[21] Appl. No.: 392,581

[22] Filed: Feb. 23, 1995

[51] Int. Cl.[6] .................................................. G12B 9/00
[52] U.S. Cl. .................. 248/27.1; 235/462; 248/220.22
[58] Field of Search .................................. 248/27.1, 27.3, 248/220.21, 220.22; 235/462, 383

[56] References Cited

U.S. PATENT DOCUMENTS

| | | | |
|---|---|---|---|
| 4,020,924 | 5/1977 | Conrotto et al. | 186/1 A |
| 4,170,404 | 10/1979 | Meye et al. | 350/252 |
| 4,372,519 | 2/1983 | Huntoon | 248/466 |
| 4,656,344 | 4/1987 | Mergenthaler et al. | 235/462 |
| 4,687,165 | 8/1987 | Blackburn | 248/274 |
| 4,762,984 | 8/1988 | Knowles et al. | 235/383 |
| 5,232,185 | 8/1993 | Schorr et al. | 248/27.3 |
| 5,246,192 | 9/1993 | Aberi et al. | 248/178 |
| 5,264,956 | 11/1993 | Tzu-Chin | 235/462 X |
| 5,465,928 | 11/1995 | Massie | 248/27.1 |

*Primary Examiner*—Ramon O. Ramirez
*Attorney, Agent, or Firm*—Paul W. Martin

[57] ABSTRACT

A universal mounting apparatus and method for bar code scanners which allows newer, smaller scanners to fit within the checkout counter apertures of larger scanners. The mounting apparatus includes a cover plate having a size large enough to cover the aperture. A scanner attaches to the cover plate and is suspended from the cover plate using additional mounting hardware.

4 Claims, 3 Drawing Sheets

UNIVERSAL MOUNTING APPARATUS AND METHOD FOR BAR CODE SCANNERS

CROSS REFERENCE TO RELATED APPLICATIONS

The present invention is related to the following commonly assigned and co-pending U.S. applications:

"Modular Bar Code Scanner and Scale Assembly", invented by Collins et al., having a Ser. No. 08/392,598, and filed Feb. 23, 1995; and "Vertically Mounted Bar Code Scanner Assembly", invented by. Collins et al., having a Ser. No. 08/392,567, and filed Feb. 23, 1995.

BACKGROUND OF THE INVENTION

The present invention relates to bar code scanners and mounting hardware, and more specifically to a universal mounting apparatus and method for bar code scanners.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

Bar code scanners may be directly mounted in a horizontal fashion within an aperture in a checkout counter. Since scanners come in different sizes, aperture sizes vary as well. Thus, replacement of existing scanners with newer, smaller scanners is difficult. The checkout counter must be replaced or elaborate fasteners must be provided to attach the scanner to the aperture.

Therefore, it would be desirable to provide a method for mounting a newer, smaller scanner within an existing checkout counter aperture that does not require replacement of the checkout counter or elaborate fasteners.

SUMMARY OF THE INVENTION

In accordance with the teachings of the present invention, a universal mounting apparatus and method for bar code scanners is provided. The mounting apparatus includes a cover plate having a size large enough to cover an aperture within a checkout counter. A scanner attaches to the cover plate and is suspended from the cover plate using additional mounting hardware.

It is accordingly an object of the present invention to provide a universal mounting apparatus and method for bar code scanners.

It is another object of the present invention to provide a universal mounting apparatus which allows newer, smaller bar code scanners to be mounted within existing larger checkout counter apertures.

It is another object of the present invention to provide an apparatus and method for replacing existing scanners with newer, smaller scanners.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
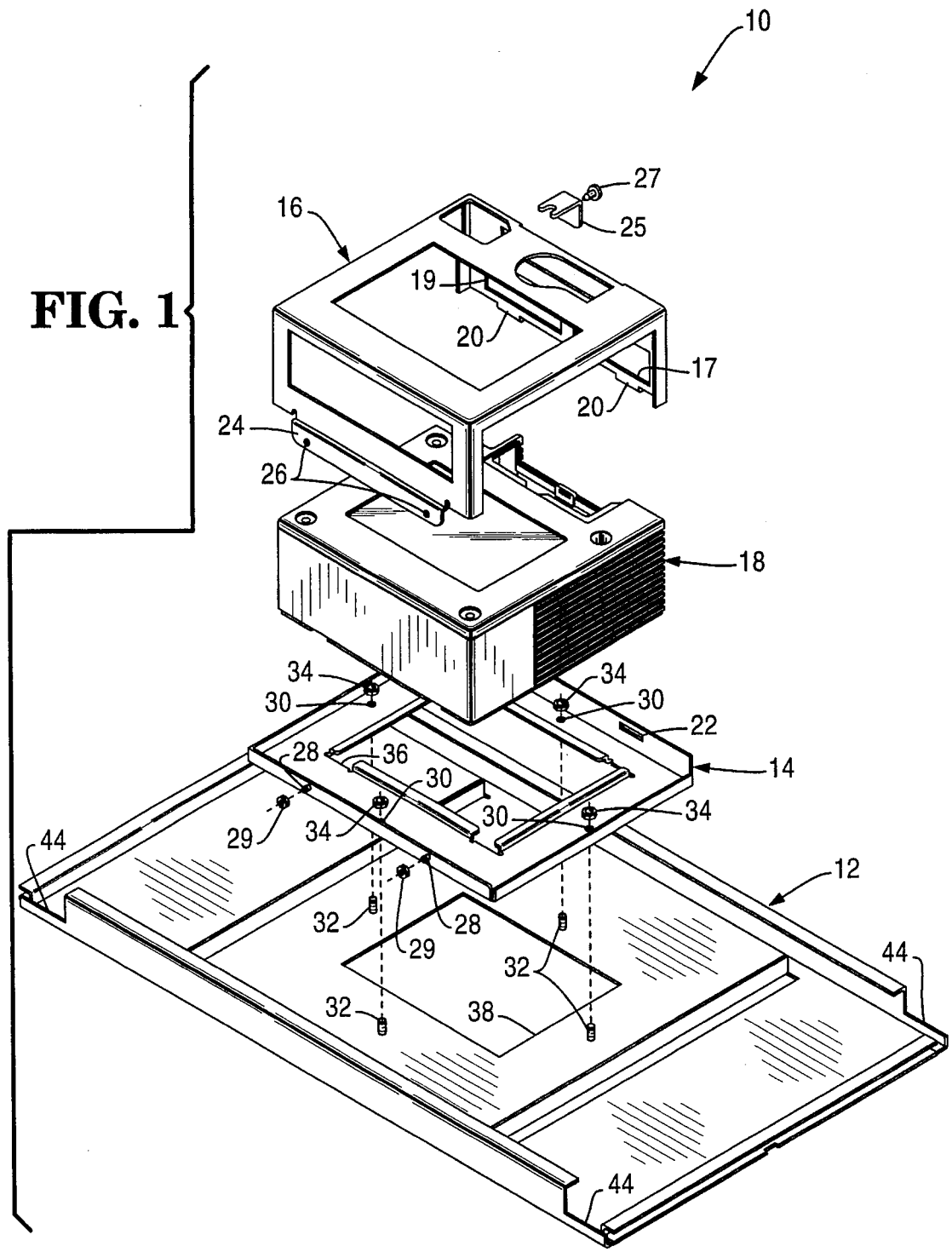
FIG. 1 is an bottom exploded view of a scanner assembly incorporating the mounting apparatus of the present invention.

Referring now to FIG. 1, scanner assembly 10 includes cover plate 12, scanner container cover member 14, scanner container bottom member 16, and scanner 18. Cover plate 12, cover member 14, and bottom member 16 form the universal mounting apparatus of the present invention.

Scanner 18 is an NCR model 7880 scanner, although other scanners are also envisioned for use with the present invention.

Figure 2:
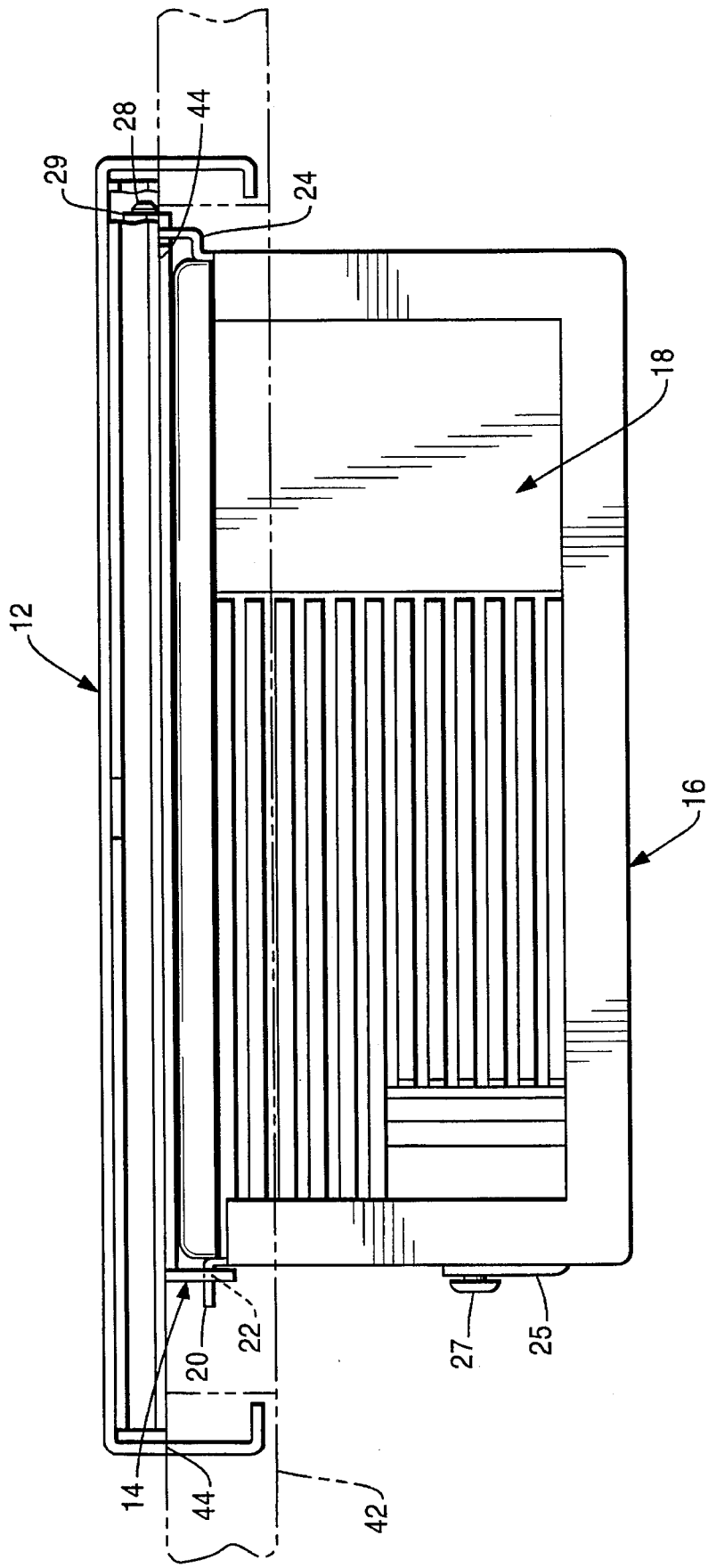
FIG. 2 is an assembled side view of the scanner assembly of FIG. 1.

Scanner 18 is enclosed by scanner container bottom member 16 and scanner container cover member 14. Tab 25 and screw 27 secure scanner 18 in place. Cover member 14 fastens to cover plate 12 and the entire assembly 10 rests on a checkout counter with the scanner suspended from cover plate 12 (FIG. 2).

In more detail, bottom member 16 is generally box-like in shape. One side of bottom member 16, flanges 20 engage corresponding apertures 22 within cover member 14. Apertures 17 and 19 provide paths for scale, and power and signal cables to scanner 18. On another side of bottom member 16, flange 24 contains apertures 26 through which corresponding threaded studs 28 on cover member 14 are inserted. Bottom member 16 has enough flexibility to allow flange 24 to slip over and engage pins 28. Nuts 29 secure cover member 14 in place.

Cover member 14 includes apertures 30 through which threaded studs 32 on cover plate 12 are inserted. Cover member 14 is secured to cover plate 12 by applying nuts 34 to threaded studs 32.

Cover member 14 also includes a central aperture 36 which allows scanning light beams from scanner 18 to be emitted without obstruction by cover member 14.

Cover plate 12 also has an aperture 38 which allows scanning light beams from scanner 18 to be emitted without obstruction by cover plate 12. Cover plate 12 is designed for replacing an NCR model 7820 scanner with an NCR 7880. The older scanner is removed from the aperture and the mounting apparatus of the present invention is then inserted within the aperture so that scanner 18 is suspended from cover plate 12. Cover plate 12 is large enough to cover the existing aperture for the NCR model 7820 in the checkout counter.

FIG. 2 shows the completed assembly 10 installed within aperture 40 of checkout counter 42. Cover member 14 is fastened to cover plate 12. Scanner 18 is then placed on cover member 14. Bottom member 16 is secured to cover member 14. Finally, the entire assembly 10 is turned over and inserted into checkout counter 42 so that lips 44 rest on checkout counter 42.

Scanner 18 is smaller than aperture 40. Cover plate 12 is designed and manufactured to fit a particular aperture size. However, the size of the hardware (in this example, bottom member 16 and cover member 14) which attaches scanner 18 to cover plate 12 is determined by the size of scanner 18. Thus, scanner 18 may be mounted to many different cover plates and apertures. By suspending scanner 18 from cover plate 12, the mounting apparatus of the present invention also avoids use of special brackets for mounting scanner 18 directly to aperture 40.

Figure 3:
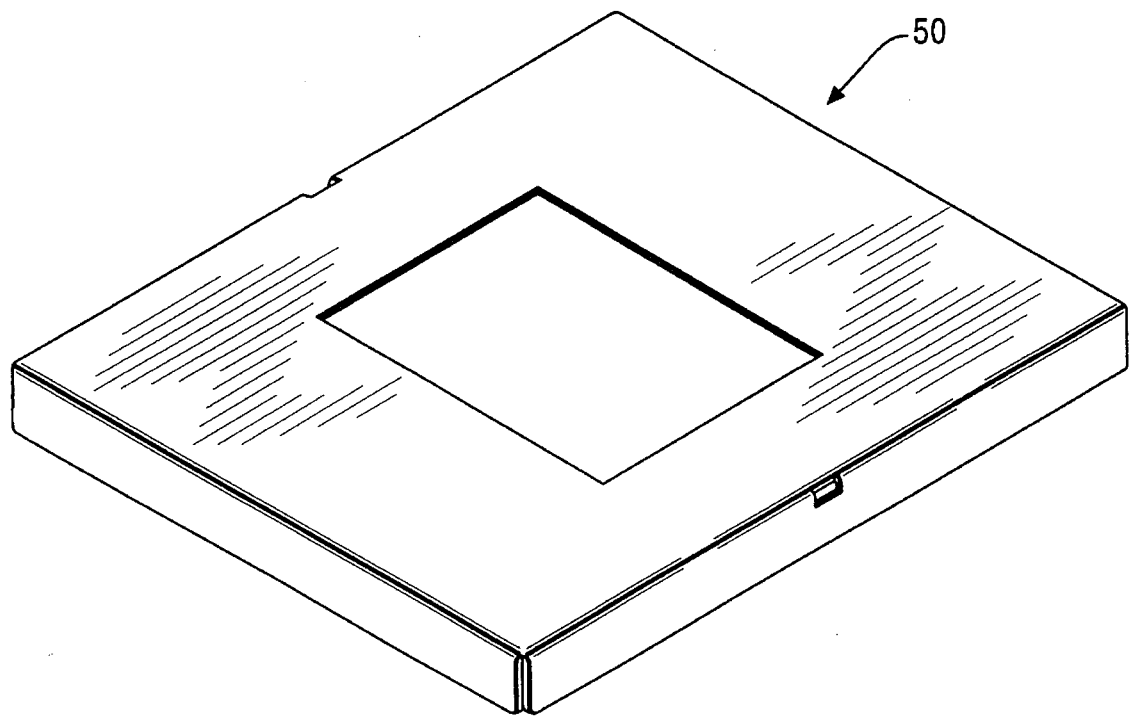
FIGS. 3 is a perspective views of an additional cover plate.

FIG. 3 illustrates another cover plate 50 which allows scanner 18 to be inserted into the checkout counter aperture of an NCR model 7852 scanner. Advantageously, various additional cover plates may be used to mount a single type of scanner 18 within apertures of different sizes.

Although the present invention has been described with particular reference to certain preferred embodiments thereof, variations and modifications of the present invention can be effected within the spirit and scope of the following claims.

What is claimed is:

1. A mounting apparatus for a replacement bar code scanner comprising:

a cover plate having a size large enough to cover an aperture in a checkout counter created for a removed bar code scanner which is larger than the replacement bar code scanner, wherein the cover plate also has a bottom surface; and a support member which fastens to the bottom surface of the cover plate and which suspends the replacement bar code scanner from the bottom surface of the cover plate within the aperture, including a box-like enclosure, including a base portion containing the replacement bar code scanner and a lid portion which fastens to the base portion and to the bottom surface of the cover plate.

2. A mounting apparatus for a replacement bar code scanner comprising:

a cover plate having a size large enough to cover an aperture in a checkout counter created for a removed bar code scanner which is larger than the replacement bar code scanner, wherein the cover plate also has a bottom surface; and a box-like enclosure containing the replacement bar code scanner which fastens to the bottom surface of the cover plate so that the replacement bar code scanner is suspended from the bottom surface of the cover plate within the aperture.

3. The mounting apparatus as recited in claim 2, wherein the box-like enclosure comprises:

a base portion which contains the bar code scanner; and a lid portion which couples to the bottom surface of the cover plate and to the base portion.

4. A method for mounting a replacement bar code scanner in a checkout counter aperture created for a removed scanner larger than the replacement bar code scanner comprising the steps of:

providing a cover plate having a size large enough to cover the aperture and having a bottom surface;

providing a box-like enclosure, including a base portion and a lid portion;

mounting the lid portion to the bottom surface of the cover plate;

inserting the replacement scanner into the base portion; and coupling the base portion to the lid portion so that the scanner is suspended from the bottom surface of the cover plate.

* * * * *